July 23, 1957  J. H. VAN ALSBURG  2,800,304
PORTABLE CATTLE GUARD
Filed Oct. 8, 1953
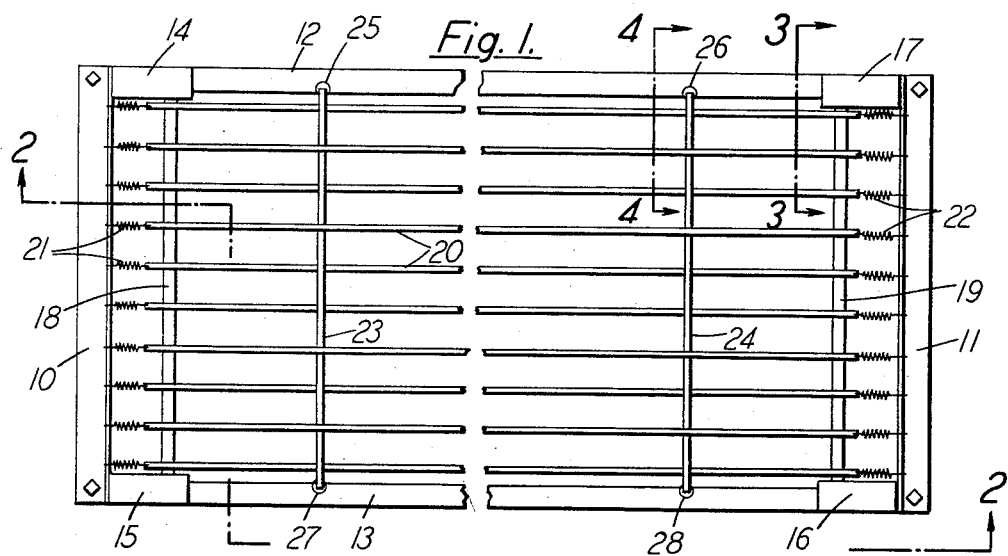
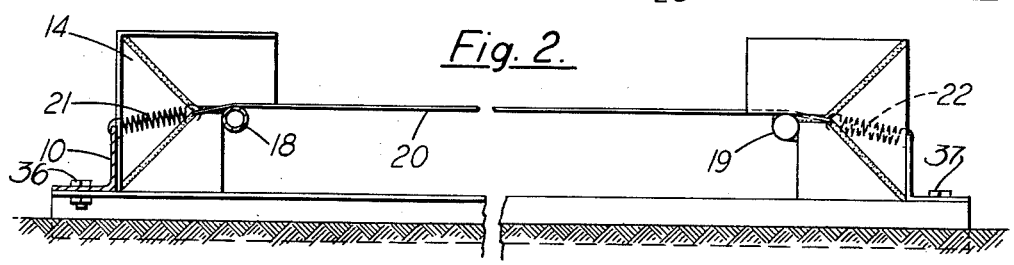
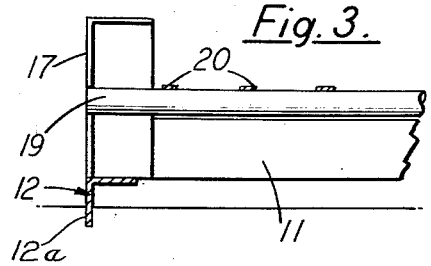
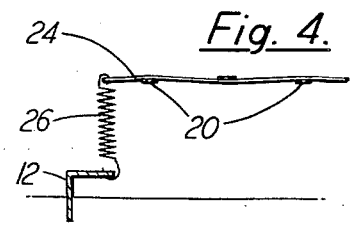
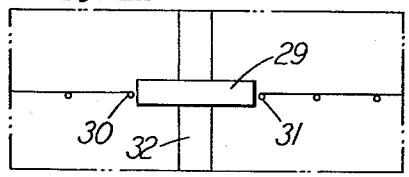
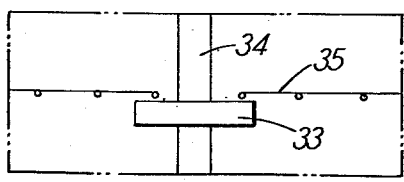
INVENTOR.
Jerold H. Van Alsburg
BY
Attorney United States Patent Office 2,800,304
Patented July 23, 1957

2,800,304

PORTABLE CATTLE GUARD

Jerold H. Van Alsburg, Santa Fe, N. Mex.

Application October 8, 1953, Serial No. 385,009

3 Claims. (Cl. 256—14)

The present invention provides a portable barrier which may be positioned across a roadway at the intersection of the roadway and a fence line for the purpose of preventing the movement of cattle out of the enclosure defined by the fence. Devices for performing this general purpose are known, and usually involve a permanent installation with at least some degree of ground excavation. It is well-known that a series of spaced rails arranged transversely to the road will accomplish this function, since the cattle do not favor moving over an area where there is such obviously poor footing. In general, these devices have the purpose of preventing the passage of cattle over the roadway without erecting a barrier of such a type as would bar the passage of vehicles.

The present invention operates in a somewhat different manner from the ordinary rail-type cattle guard, but nevertheless establishes an area where the footing characteristics are such as to discourage the movement of cattle. In place of presenting a danger of entrapment between heavy rails, the present invention provides a series of spaced parallel tension members disposed at a short distance above a roadway and which would serve to entangle the feet of any animal attempting to move across the device. The particular tension members utilized are preferably formed of metal strips which are generally rectangular in cross section. The corners at the edges of these strips present what amounts to cutting edges, and contact with them by the animal results in such immediate discomfort as to discourage further movement across the device.

The preferred form of the invention involves a rectangular frame formed primarily of standard structural sections, with a pair of beams mounted in substantially parallel relationship at opposite ends of this frame. A series of spaced parallel tension strips spans the distance between these beams and tension in these strips is maintained by suitable springs acting between the ends of the strip and the frame. The position of the beams establishes the plane of the strips, and the distance above the ground is low enough so that an approaching vehicle will depress the strips under the tires without undesirable consequences. Such depression of the strips is accompanied by some degree of extension of the tension springs, which immediately pull the strips back into co-planar relationship after the vehicle has passed over. The location of the plane of the strips a few inches above ground level, however, provides a sufficient entanglement to the feet of cattle as to surely discourage their movement across the device. It is also preferable to include a series of members arranged transversely to the tension strips and either secured thereto or interwoven therewith, with springs connecting the ends of these transverse members to the frame. The purpose of these transverse members is to control the oscillation and rebound of the strips as a vehicle is moving over the device.

A very important advantage of a device constructed as outlined above is its portability. The repair of such a unit does not require the services of a construction crew, but only the work of a fairly skilled mechanic. If it becomes necessary to perform an extensive amount of work on the device, it may be replaced by another one and picked up with very little effort and placed in a truck for transportation to a shop where the desired facilities are available. It is also possible to arrange these units at locations where excavations and permanent installations are impractical, and also at temporary fence openings where the cost of a permanent installation would be unwarranted.

The several features of the present invention will be discussed in detail through an analysis of the particular embodiments illustrated in the accompanying drawing. In the drawing, Figure 1 presents a broken plan view of a device embodying the preferred form of the present invention.

Figure 2 is a section on the plane 2—2 of Figure 1.

Figure 3 presents a section on the plane 3—3 of Figure 1 on an enlarged scale.

Figure 4 presents a section on the plane 4—4 of Figure 1.

Figures 5 and 6 shows two different types of installation of the device in schematic diagrams.

Referring to Figure 1, a substantially rectangular frame is formed by the end members 10 and 11 and the side rails 12 and 13. These members are preferably formed of standard structural sections such as that which is commonly referred to as "angle iron." The downwardly-extending legs (as indicated at 12a in Figure 3) of the angle iron forming the side rails 12 and 13 act as cleats which engage the ground and tend to maintain the position of the device on a gravel roadway or on an area which has similar characteristics. Over concrete or some other road material in which the device will not embed itself, it may be desirable to secure the device in position with stakes (not shown) or other conventional anchoring means driven between or secured to those portions of the frame which overhang the hard surface of the road.

At each side of the opposite ends of the rectangular frame, brackets are secured as indicated at 14 through 17, inclusive. These brackets have the primary function of providing a support for the beams 18 and 19 which position the tension strips 20. Suitable springs as indicated at 21 and 22 are arranged at opposite ends of each of the strips 20 to maintain tension at all times. The frame assembly may be welded or bolted together as shown at 36 and 37 in Figure 2, or any combination of these procedures which may suit the particular requirements of the user.

In order to prevent undue rebound of the tension strips 20, the transverse members 23 and 24 are shown interwoven between the strips 20, and secured at opposite ends to the side rails 12 and 13 of the frame by springs 25 through 28, inclusive.

As indicated best in Figures 3 and 4, the preferred cross section of the metal strips 20 is rectangular in form, resulting in the presentation of rather sharp edges which tend to discourage cattle from moving through the device. The unit illustrated in Figures 1 through 4 may be installed in several ways at the junction of a roadway and a fence line. Two of these are illustrated in Figures 5 and 6. In Figure 5, a barrier generally indicated at 29 is disposed between the posts 30 and 31 which define the gap in the fence line at the intersection of the roadway 32. In Figure 6, a barrier device 33 is positioned across a roadway 34 and disposed entirely at one side of a fence line 35 so as to cover the opening at the road intersection.

The arrangement in Figure 6 may be conveniently utilized when a fence line is particularly close to a property line, resulting in the desirability of maintaining all installations at one side of the fence.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. In combination with a roadway, a portable cattle-barrier, comprising: frame means provided with ground-engaging members and having spaced substantially parallel beams fixed with respect thereto and disposed a small distance above ground level; a plurality of spaced strips of rectangular cross section mounted with the width of said strips parallel to ground level and extending across between said beams and in bearing engagement therewith, said strips having a portion at each end extending beyond said beams, respectively, said portions being connected to said frame means with tension spring means; restraining means extending transversely to and interwoven with said strips; and yieldable means connecting said restraining means to said frame means.

2. In combination with a roadway, a portable cattle-barrier, comprising: frame means provided with ground-engaging members and having spaced substantially parallel beams fixed with respect thereto and disposed a small distance above ground level; a plurality of spaced strips of rectangular cross section mounted with the width of said strips parallel to ground level and extending across between said beams and in bearing engagement therewith, said strips having a portion at each end extending beyond said beams, respectively, said portions being connected to said frame means with tension spring means; restraining means extending transversely to and engaging said strips; and yieldable means connecting said restraining means to said frame means.

3. A portable cattle-barrier, comprising: frame means provided with ground-engaging members and having spaced beams fixed with respect thereto and disposed a small distance above ground level; and a plurality of spaced tension members extending across between said beams and in bearing engagement therewith, said strips having a portion at each end extending beyond said beams, respectively, said portions being connected to said frame means with tension spring means.

References Cited in the file of this patent

UNITED STATES PATENTS

| | | |
|---|---|---|
| 984,001 | Ingraham | Feb. 14, 1911 |
| 2,518,855 | Balzer | Aug. 15, 1950 |
| 2,539,214 | Warner | Jan. 23, 1951 |